United States Patent [19]
Dearlove

[11] 3,927,780
[45] Dec. 23, 1975

[54] LOADING APPARATUS FOR A COLLECTION VEHICLE

[75] Inventor: William E. Dearlove, Washington, Ill.

[73] Assignee: Caterpillar Tractor Co., Peoria, Ill.

[22] Filed: Oct. 1, 1974

[21] Appl. No.: 511,100

[52] U.S. Cl. ............ 214/519; 214/83.36; 198/178; 198/167; 198/7 BL
[51] Int. Cl.² .......................................... B60P 1/36
[58] Field of Search ........... 214/518, 519, 520, 521, 214/522, 83.14, 83.36, 83.26, 356; 198/7 BL, 9, 167, 178, 198

[56] References Cited
UNITED STATES PATENTS

| 649,609 | 5/1900 | Layman et al. ................. 214/519 R |
| 919,351 | 4/1909 | Herzog .......................... 198/178 X |
| 2,664,691 | 1/1954 | Wiebe ............................ 198/178 X |
| 2,977,266 | 3/1961 | Sedgley .............................. 198/198 |
| 3,062,394 | 11/1962 | Bowles ............................. 214/83.3 |
| 3,272,309 | 9/1966 | Reading ......................... 198/167 X |
| 3,597,927 | 8/1971 | Hemphill ....................... 214/518 X |
| 3,613,868 | 10/1971 | Rickerd ......................... 214/356 X |
| 3,730,367 | 5/1973 | Heffington ....................... 214/518 |
| 3,734,318 | 5/1973 | Kraus ........................... 198/7 BL X |
| 3,802,022 | 4/1974 | Fleming ........................ 214/522 R |
| 3,815,765 | 6/1974 | Moser et al. ........................ 214/82 |

*Primary Examiner*—Albert J. Makay
*Attorney, Agent, or Firm*—Ralph E. Walters

[57] ABSTRACT

Refuse collecting apparatus including a vehicle mounting a refuse accumulating compartment. A chute is movably mounted on the vehicle frame and has an inlet end extending forwardly of the front end of the vehicle and an outlet end in communication with the compartment. A prime mover is employed for moving the chute relative to the vehicle to and from a position wherein the inlet end of the chute is in substantial abutment with the underlying terrain over which the vehicle may travel so that the inlet end can be disposed adjacent the ground to receive refuse resting on the ground. A conveyor is provided within the chute for engaging refuse received within the inlet end and transporting it to the collecting compartment.

4 Claims, 3 Drawing Figures

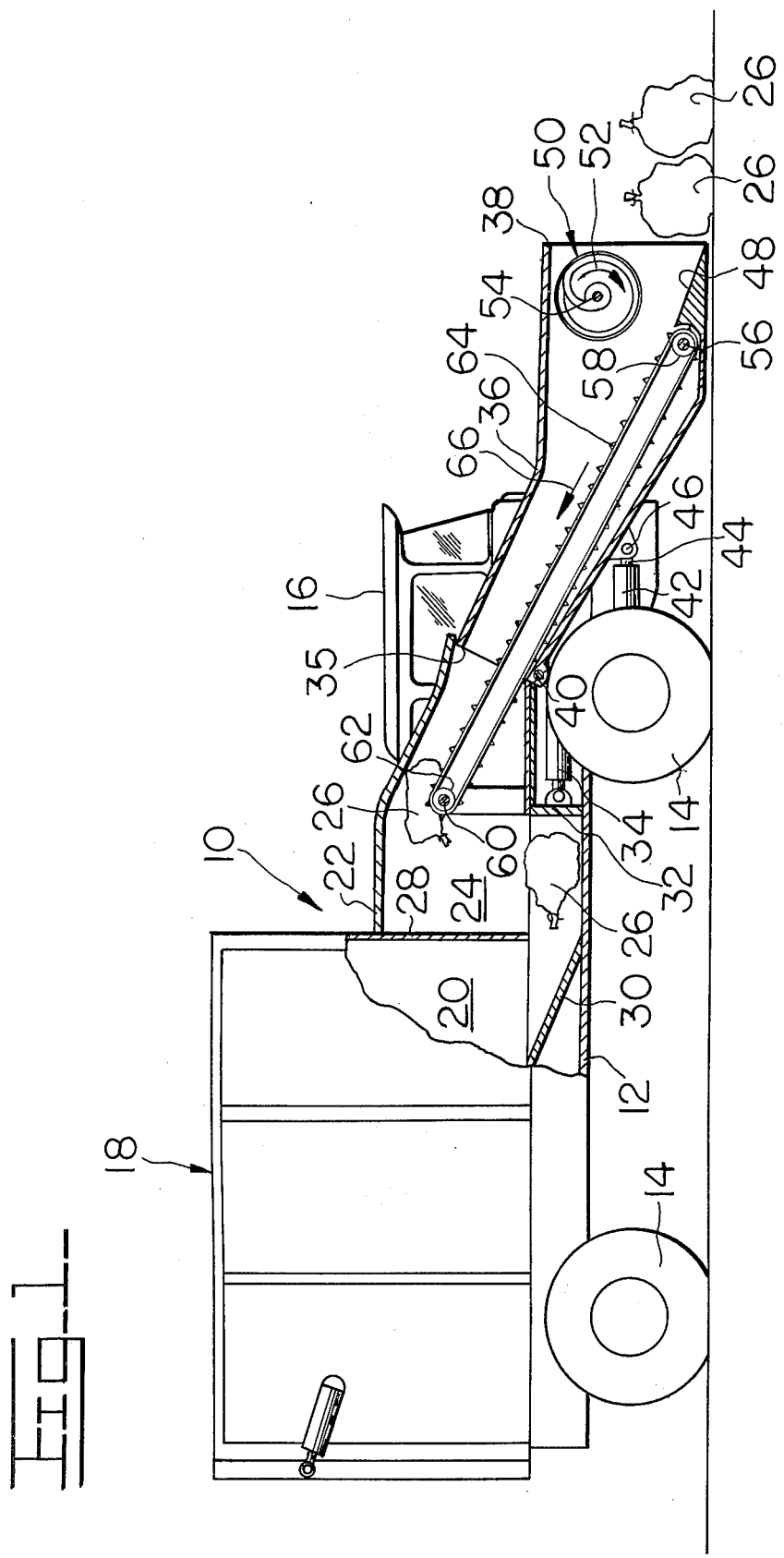

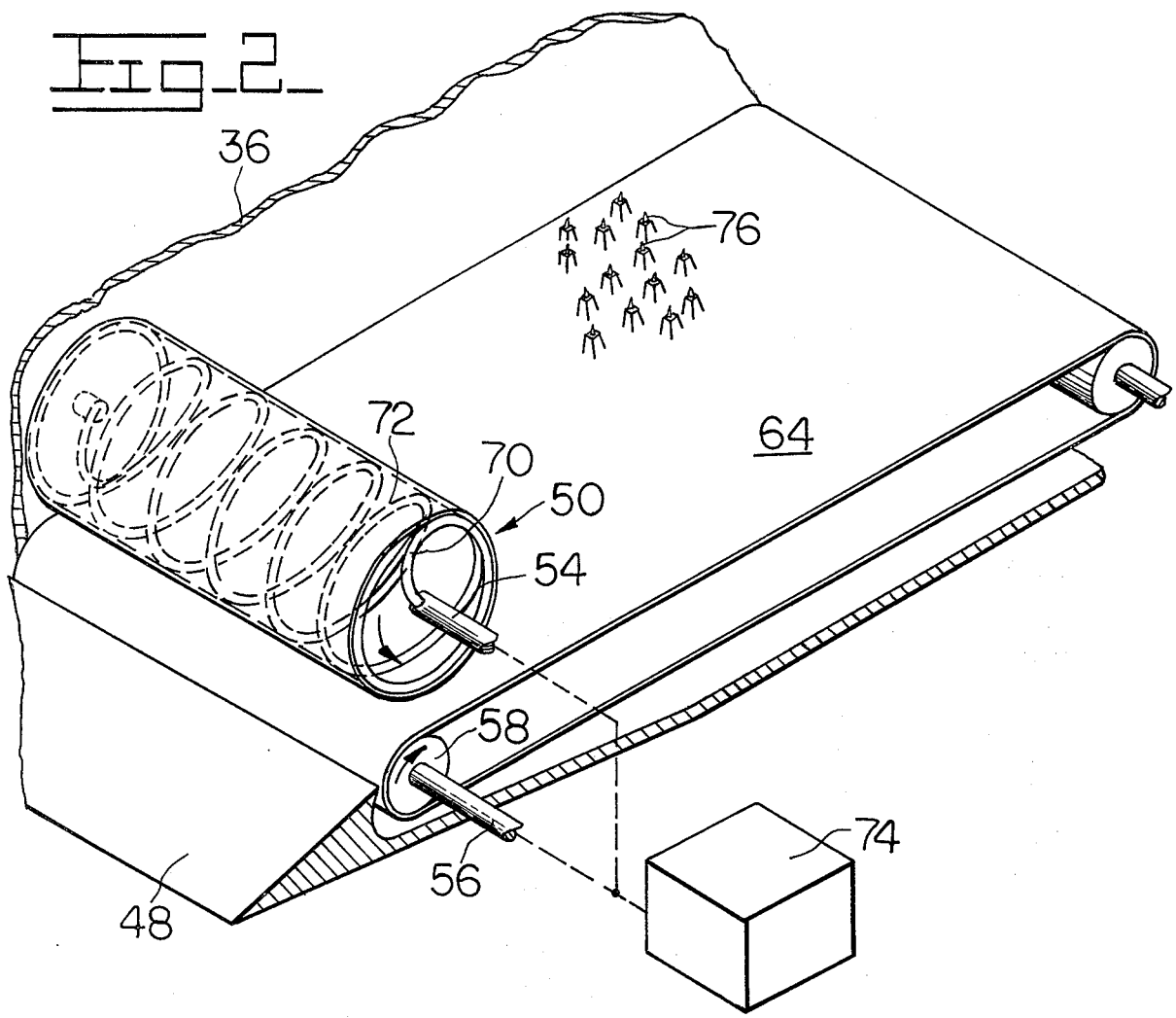
Fig_2_
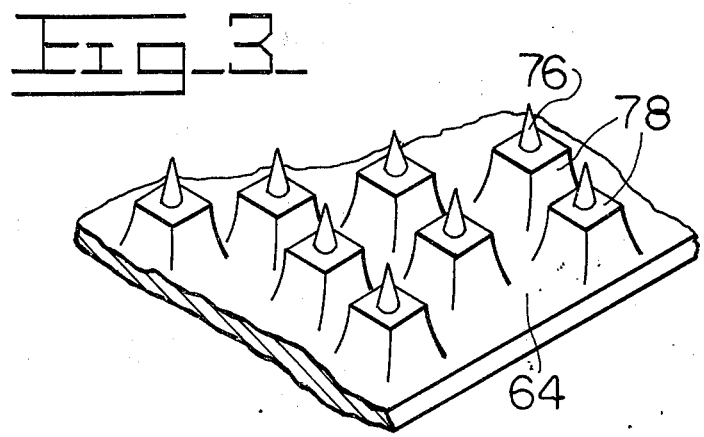
Fig_3_

LOADING APPARATUS FOR A COLLECTION VEHICLE

BACKGROUND OF THE INVENTION

This invention relates to refuse collecting apparatus, and more specifically, to a vehicle for use in refuse collection, such as those illustrated in U.S. Pat. No. 3,815,765 to Moser et al., assigned to the assignee of this application, and U.S. Pat. No. 3,730,367 to Heffington.

Present methods employed today for collecting residential refuse rely heavily upon manual labor. Consequently, the cost of the same is increasing at a rapid rate due to the rapidly rising cost of labor. There is, therefore, a real need for more fully mechanized means of collecting refuse which require a minimum of attendant manual labor to thereby reduce the cost of the refuse collecting process.

SUMMARY OF THE INVENTION

It is the principal object of the invention to provide a new and improved refuse collecting apparatus. More specifically, it is an object of the invention to provide such an apparatus in connection with a vehicle which is particularly suited for the collection of residential refuse and which requires minimal attendant manual labor by reason of a high degree of mechanization.

An exemplary embodiment of the invention achieves the foregoing objects in a structure including a vehicle having a frame bearing a refuse accumulating compartment. A chute is movably mounted on the frame and has an inlet end extending forwardly of the front end of the frame and an outlet end in communication with the compartment.

Means are provided for moving the chute on the frame to and from a position wherein the inlet end is in substantial abutment with the ground over which the vehicle may travel so that the inlet end may be disposed to receive refuse resting on the underlying terrain. A conveyor within the chute engages refuse adjacent the inlet end and transports the same to the compartment.

In the preferred embodiment of the invention, the conveying means comprises a driven endless belt. Extending transversely across the inlet end of the chute is a rotary drum feeding device which is operative to impel refuse onto the conveyor.

In a highly preferred embodiment, the conveying surface of the endless belt has refuse gripping means thereon in the form of spikes so that the rotary drum is operative to drive refuse onto the spikes to provide for positive gripping. Where, as is fairly typical, the refuse is packed in plastic bags, the spikes firmly grip the bag as well as puncture the same. The latter assists in speedy decomposition of the material within the bags.

Preferably, the belt includes a plurality of flexible pedestals, each one mounting one of the spikes so that the spikes may deflect on their pedestal mounting under heavy loads without breaking off.

The rotary drum is preferably flexible to conform to the shape of refuse being loaded. In a highly preferred embodiment, it is defined by a helical coil spring covered by a layer of flexible material.

Other objects and advantages will become apparent from the following specification taken in connection with the accompanying drawings.

DESCRIPTION OF THE DRAWINGS

FIG. 1 is a side elevation of a refuse collecting vehicle made according to the invention with parts shown in section;

FIG. 2 is a fragmentary, perspective view of the inlet end of a chute employed in connection with the invention; and FIG. 3 is an enlarged, fragmentary view of the conveying surface of a conveyor belt employed in the chute.

DESCRIPTION OF THE PREFERRED EMBODIMENT

An exemplary embodiment of a refuse collecting apparatus made according to the invention is illustrated in FIG. 1 and is seen to include a vehicle, generally designated 10. The vehicle 10 includes spaced apart, longitudinally extending frame members 12 (only one of which is shown) upon which wheels 14 are suitably journalled.

The forward end of the frame mounts an operator cab 16, which may be of conventional construction and will typically house controls for the collection apparatus to be described in greater detail hereinafter.

The rear end of the vehicle 10 mounts a refuse receiving body, generally designated 18, which defines a cavity 20 into which refuse is fed, as will be seen. If desired, the body 18 may house compacting apparatus such as that disclosed in the previously identified Moser et al patent.

Just forwardly of the body 18, a hood 22 affixed to the frame, defines a hopper 24 into which refuse 26 is fed. The hopper 24 is separated from the cavity 12 by a panel 28, the lower end of which terminates above a ramp-like surface 30 so that material can move from the hopper 24 to the cavity 20.

For purposes of accomplishing such movement, a ram 32, which may be selectively reciprocated by a hydraulic cylinder 34 is provided. Suitable controls for the cylinder 34 may be housed within the operator cab 16.

The forward end of the hood 22 telescopingly receives the outlet end 35 of a chute 36. The chute 36 has an inlet end 38 disposed forwardly of the front end of the vehicle 10. A pivot shaft 40 adjacent the outlet end 35 of the chute 36 journals the chute 36 for pivotal movement about a generally horizontal axis relative to the frame of the vehicle 10. A hydraulic cylinder 42, pivotally connected to the frame by means not shown, has a rod 44 connected by a pivot pin 46 to the chute 36 so that the latter may be selectively raised or lowered. When the vehicle is in transit, the chute 36 will typically be raised so that it will not come into damaging contact with the underlying terrain while when the vehicle is stopped, or moving very slowly, the chute 36 will be lowered such that the inlet end is in substantial abutment with the underlying terrain over which the vehicle is travelling so as to allow refuse 26 resting on the underlying terrain to be received within the inlet end 38. Suitable controls for the cylinder 42 to effect such movement will be housed in the operator cab 16.

The lowermost surface of the inlet end 38 has a ramp-like surface 48 for the purpose of permitting easy introduction of refuse 26 into the chute 36. Just above the ramp 48 is a rotary drum-like feeding device, generally designated 50, which is driven in the direction of an arrow 52 on a horizontal shaft 54 which extends transversely to the length of the chute. As will be seen, the drum 50 is operative to impel refuse 26 into the chute 36.

Near the bottom of the chute and adjacent the inlet end 38, a horizontally extending shaft 56 mounts a roller 58 while a similar shaft 60 journalled within the hopper 28, mounts a roller 62.

Trained about the rollers 58 and 62 is an endless, flexible, conveyor belt 64 which is driven such that its upper run moves in the direction of an arrow 66 to convey refuse 26 impelled onto the conveyor 64 by the rotary drum 50 upwardly through the chute and into the hopper 24.

Turning now to FIG. 2, the rotary drum 50 will be described in greater detail. In the preferred embodiment, the same is defined by a coil spring 70 mounted for rotation with the shaft 54. A flexible cover 72 formed of rubber or plastic or the like, is disposed about the convolutions of the coil spring 70 for the purpose of precluding refuse from being forcefully caught between the convolutions of the coil spring 70. It will thus be seen that the rotary drum 50 is flexible and capable of conforming to the shape of the refuse entering the inlet end 38.

Suitable driving movement is applied to both the shaft 54 and the shaft 56 by any suitable prime mover, schematically shown at 74.

As can be seen from FIGS. 2 and 3, the conveying surface of the conveyor 64 is provided with a plurality of spikes 76 which serve as a positive gripping means for the refuse. More particularly, the compressive action on the refuse entering the inlet end by the rotary drum 50 causes the refuse to be impaled on the spikes 76 to be positively gripped and carried to the hopper 24 at which time the refuse will fall from the spikes under the influence of gravity.

In addition to the positive feed function, the spikes 76 provide a further beneficial function. As is well known, frequently, refuse is wrapped in plastic bags or the like which are relatively air-impervious. Consequently, refuse capable of undergoing decomposition when exposed to air has such decomposition substantially retarded when contained in such plastic bags. However, in a refuse collecting vehicle made according to the invention, the spikes 76, by reason of their puncturing such bags and ripping the same somewhat, allow air to relatively freely enter the plastic bags so that decomposition is not retarded.

FIG. 3 shows a preferred means by which the spikes 76 are secured to the conveyor 64. Preferably, the conveyor 64 is provided with a plurality of pedestals 78 which may be in the nature of integrally formed bosses. Since the conveyor is formed of flexible material, pedestals 78 will likewise be flexible. The pedestals 78 are employed for mounting the spikes 76 as shown, and by reason of their flexible nature, when the spikes 76 are subjected to high loads which would ordinarily tend to cause the same to break away from the conveyor 64, the pedestals 78 will flex so that such breakage does not occur. Consequently, the life of the belt 64 is substantially prolonged.

From the foregoing, it will be appreciated that refuse collecting apparatus made according to the invention achieves the previously mentioned objects of the invention. In particular, it will be appreciated that only one laborer is required to operate the apparatus and, by reason of its construction, the operator need never leave the operator cab 16. Thus, it will be appreciated that the invention eliminates the relatively typical two or three-man crew presently employed with refuse collecting apparatus and, moreover, eliminates any need for the time-consuming and, therefore, costly, movements of the operator from the cab to assist in refuse loading.

I claim:

1. Refuse collecting apparatus comprising,
a vehicle having a frame, a front end, a rear end, and means defining a refuse accumulating compartment on said frame;
a chute movably mounted on said frame and having an inlet end extending forwardly of said front end and an outlet end in communication with said compartment;
means for moving said chute on said frame to and from a position wherein said inlet end is in substantial abutment with the underlying terrain over which said vehicle may travel whereby said inlet end may be disposed to receive refuse resting on the underlying terrain;
conveying means including a driven endless belt within said chute for engaging refuse adjacent said inlet end and transporting said refuse to said compartment, said belt having a conveying surface provided with a plurality of spikes adapted to puncture plastic refuse containing bags; and
a rotatable, flexible drum mounted in said chute extending transversely across said inlet end, and means for rotating said drum whereby said drum will flexibly urge refuse containing plastic bags or the like against said spikes to be ripped thereby to allow air to freely enter the bags.

2. The refuse collecting apparatus of claim 1 wherein said drum is defined by a generally horizontally disposed, helical coil spring adapted to flex and conform to the shape of refuse entering said inlet end.

3. The refuse collecting apparatus of claim 2 further including a layer of flexible material housing said coil spring.

4. Refuse collecting apparatus comprising, a vehicle having a frame, a front end, a rear end, and means defining a refuse accumulating compartment on said frame; a chute movably mounted on said frame and having an inlet end extending forwardly of said front end and an outlet end in communication with said compartment; means for moving said chute on said frame to and from a position wherein said inlet end is in substantial abutment with the underlying terrain over which said vehicle may travel whereby said inlet end may be disposed to receive refuse resting on the underlying terrain; conveying means within said chute including a driven endless belt extending substantially the length of said chute for engaging refuse adjacent said inlet end and transporting said refuse to said compartment, the conveying surface of said endless belt including gripping means thereon, said gripping means comprising a plurality of spikes movable with said conveyor belt; a plurality of flexible pedestals on said conveyor belt, one for each spike, said spikes projecting outwardly from a corresponding one of said pedestals; and rotary drum feeding means in said chute at said inlet end and extending thereacross, said feeding means being spaced above said conveyor and operative to impel refuse onto said conveyor.

* * * * *